April 24, 1956   A. F. CAPPETTA   2,742,680
JALOUSIE WINDOW FOR AUTOMOBILES
Filed May 28, 1953   2 Sheets-Sheet 1
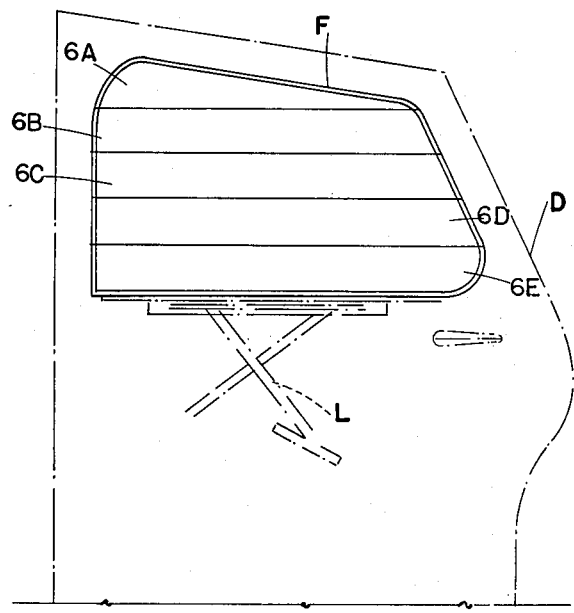
FIG. 1
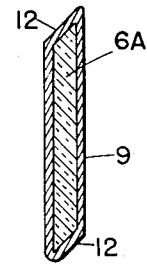
FIG. 3
FIG. 4
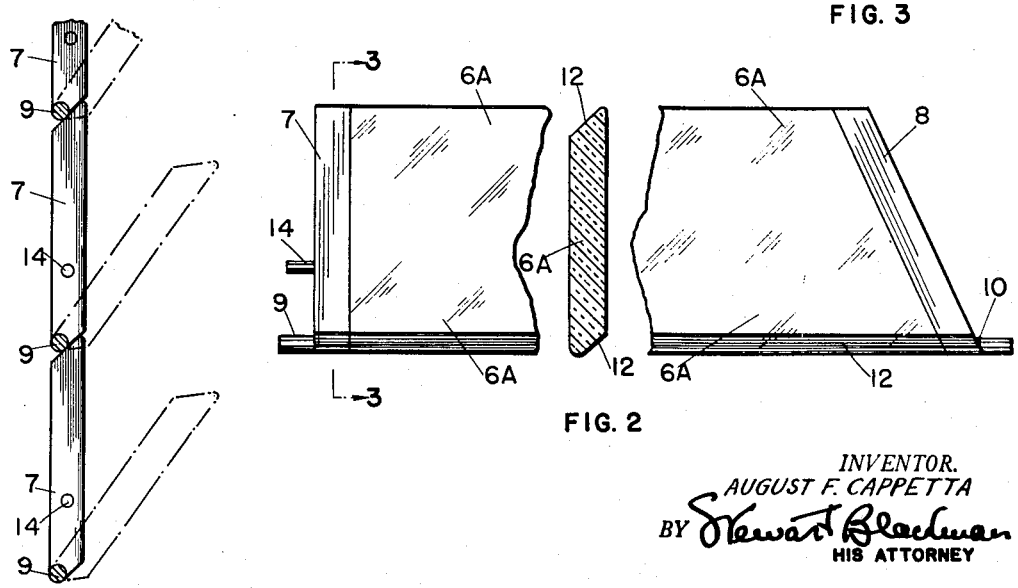
FIG. 2
INVENTOR.
AUGUST F. CAPPETTA
BY Stewart Blackman
HIS ATTORNEY April 24, 1956  A. F. CAPPETTA  2,742,680
JALOUSIE WINDOW FOR AUTOMOBILES
Filed May 28, 1953  2 Sheets-Sheet 2
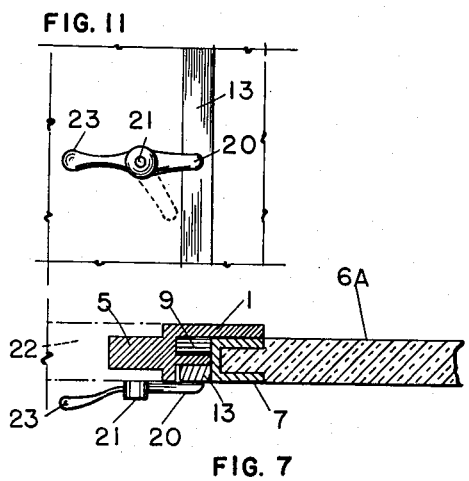
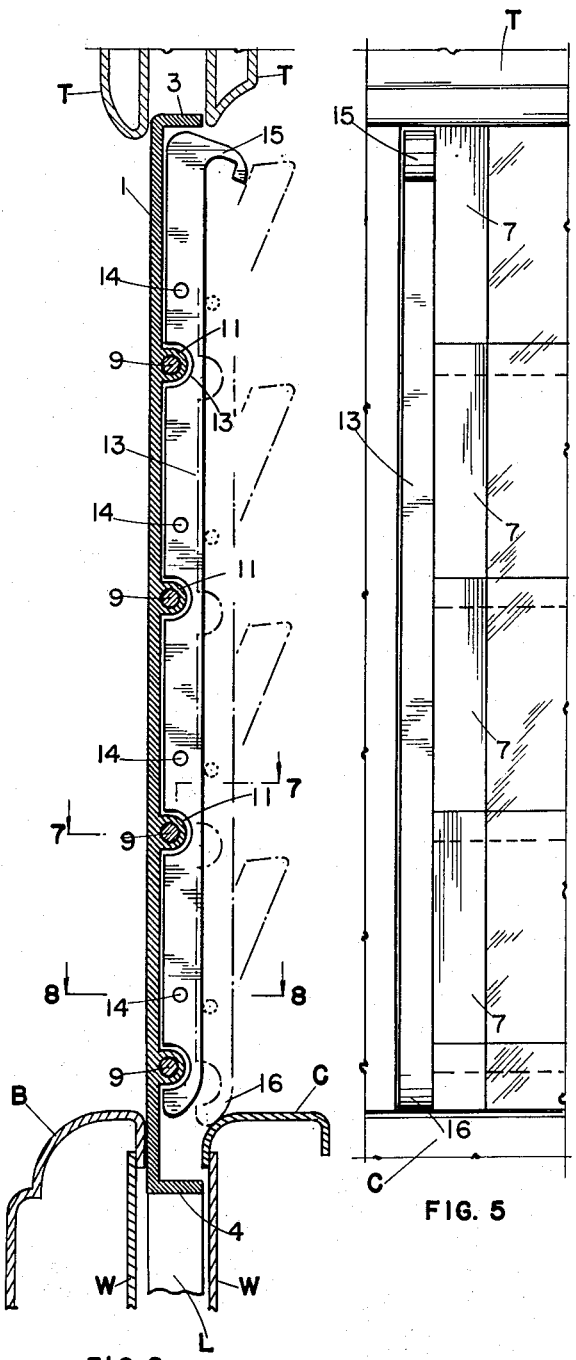
INVENTOR.
AUGUST F. CAPPETTA
BY Stewart Blackman
HIS ATTORNEY

United States Patent Office 2,742,680
Patented Apr. 24, 1956

2,742,680

JALOUSIE WINDOW FOR AUTOMOBILES

August F. Cappetta, Miami, Fla.

Application May 28, 1953, Serial No. 358,017

3 Claims. (Cl. 20—62)

This invention relates to improvements in jalousie windows for automotive vehicles and more especially for vehicles of the passenger carrying type.

An object of the invention is to provide a jalousie window which will be simple and efficient in operation.

A further object is to provide a jalousie window of the character described which will be capable of ready and economical manufacture.

Yet another object of the invention is to provide a jalousie window which may be closed against the weather to positively exclude the elements from the car interior.

These and other advantages of the invention will be discernible from the detailed description thereof hereinafter set forth.

The invention is embodied in a jalousie structure exemplified in the accompanying drawings in which the views are as follows, like reference numerals designating identical parts throughout the several views:

Fig. 1, an elevation of a window to which the invention may be applied;

Fig. 2, an elevation of one of the louvers;

Fig. 3, a section on line 3—3, of Fig. 2;

Fig. 4, an end elevation, in part, of the louver assembly;

Fig. 5, a fragmentary interior elevation of the window, and

Fig. 6, a section on line 6—6, Fig. 8;

Fig. 7, a section on line 7—7, Fig. 6;

Fig. 8, a section on line 8—8, Fig. 6;

Fig. 9, a side elevation of a modified handle;

Fig. 10, a front elevation thereof, and

Fig. 11, plan of a latching mechanism.

The jalousie window has a frame shown generally at F, Fig. 1, installed, for example, in the door D of an automobile body, this frame being movable in the usual manner by crank-operated mechanisms functioning as the window lift shown in phantom at L and known in the art. The frame is defined by a frontal facia plate 1 (Fig. 7), a side member 2, top member 3, and a bottom sash member 4 which is carried by the window lift L. Along the end face thereof, the frame has the usual tongue 5 which is adapted to slide in a rabbeted groove in its travel between the upper trim members T (Fig. 6) and the well formed between the lower outer trim B and its complementary interior trim or cowl member C, further defined by structural members W.

The window comprises the usual plurality of louvers 6A, 6B, 6C, 6D and 6E, each of which is carried at the marginal ends thereof in a pair of end frames 7 and 8. The louver may be fabricated from any conventional transparent material such as glass, Lucite, or the like. The louvers are trimmed at their ends for reception by their respective end frames with which they finish flush on all faces, as illustrated in Figs. 2, 6, and 7.

These louvers pivot on an axis defined by a pair of shafts 9 and 10 which extend endwise from the end faces of the end frames 7 and 8, respectively, to which the shafts are secured in any suitable manner (Figs. 2 and 7). The shafts are journaled in cylindrical barrels or bearings formed against the inner faces of the frame side members and fabricated integrally therewith, as at 11, Figs. 6 and 7.

Along the top and bottom edges thereof, the end frames and louvers carried thereby are beveled outwardly and downwardly as at 12, Figs. 2 and 3, to provide a relatively positive closure between adjacent louvers which are thus engageable in abutting relation against the weather, Fig. 4.

The louvers are movable from their closed to open positions by the conventional link bar or operator 13 (Figs. 5 6, and 8), which is arranged to abut the superimposed end faces of the end frames 7 along an upright side of the window. The end frames 7 have pivotable connections with the operator through pivot pins 14, the operator being indented along the front edge thereof as at 13' (Figs. 6 and 9), so as to clear the bearing members 11. At the top thereof, the operator may terminate in a handle 15 by which it is rockable between its full line and broken line positions to pivot the louvers between closed and open positions.

At the bottom thereof, the operator 13 terminates in a cam member 16 which is engageable with the adjacent interior cowl or trim member C to limit the inward movement of the operator and thus, to limit the opening of the louvers. This cam member also functions in cooperation with the cowling C to prevent the inadvertent lowering of the window while the louvers are open, the cowl C serving to force the operator 13 into its retracted position upon the downward movement of the operator when the window is lowered, thereby returning the louvers to their closed positions.

If desired, the top and bottom louvers, 6A and 6E, may be installed as stationary panels, or the bottom louver only may be stationary. In this event, it may be desirable to employ a relatively shorter operator and the handle thereon may then be modified as illustrated in Figs. 9 and 10, there being a retractible handle 15'. This handle is pivoted by a pin 17 held in the operator structure and normally urged into the dotted line position by a spring member 18 having one end coiled about the pin 17. Thus, if the operator be lowered into the well on lowering the window, the handle 15' engages the cowl C and is thereby retracted, the upper portion of this handle defining a cam 19. The operator may be restrained in its retracted position to secure the louvers in closed alinement by a suitable latch member 20 (Figs. 7 and 11), which may be pivoted in any convenient manner on a fastening 21, secured against adjacent side trim structure shown generally at 22.

Such a latch may have a handle 23, turnable about the fastening 21 so as to bring the latch 20 into engagement with the operator 13 to secure the same in its full line position (Fig. 6) and thus restrain the louvers in closed position, the latch being rotatable, of course, to its dotted line position (Fig. 11) to release the operator when it is desired to open the louvers.

The invention is thus seen to provide a novel and unique jalousie window assembly for automobile windows meeting the objectives announced hereinbefore.

It will be understood that the variety of automobile body structures and window arrangements to be encountered therein, as well as the arrangements of interior trims therefor, may dictate certain changes and modifications in the invention without departing from the scope of the appended claims, and I do not limit myself, in the minor features of the jealousie structure, to the precise assembly illustrated herein.

Having thus described the invention and the method of its practice, what I claim as new and desire to secure by Letters Patent of the United States, is:

1. In a jalousie window structure for an automobile body having a well formed under said window and means to lower the window into said well, the combination with a trim member defining the inner marginal edge of the well along the top thereof, of a frame and a plurality of louvers arranged therein for oscillation on horizontal axes, an upright operator pivoted to the louvers endwise thereof and rockable to oscillate said louvers between open and closed positions, the operator engaging the trim member on the lowering of the frame whereby to rock the operator to close the louvers for the passage thereof into the well.

2. A jalousie window structure for an automobile body having a well formed under said window, a trim member defining the inner marginal edge of said well, and means to lower said structure into the well in passage relative to said trim member, said structure comprising a frame, a plurality of louvers arranged therein for oscillation on horizontalal axes, an upright operator pivoted to the louvers endwise thereof and rockable to oscillate the louvers between open and closed positions, latching means confining said operator in louver-closing position, said operator and said trim member having cooperative cam surfaces formed thereon engageable upon the lowering of said structure to rock the operator for the closure of said louvers to permit the passage thereof into said well.

3. The invention as defined in claim 2, and: a retractible handle carried by said operator adjacent the top thereof and projecting inwardly therefrom, spring means biasing the handle into projected position, the handle being engageable with said trim member for the retraction thereof against said biasing means to permit the passage of the operator into said well.

References Cited in the file of this patent

UNITED STATES PATENTS 2,290,463    Bishop _____ July 21, 1942